US005793739A

United States Patent [19]

Tanaka et al.

[11] Patent Number: 5,793,739

[45] Date of Patent: Aug. 11, 1998

[54] DISK RECORDING AND SOUND REPRODUCING DEVICE USING PITCH CHANGE AND TIMING ADJUSTMENT

[75] Inventors: Kei Tanaka; Kazuhiko Honda, both of Hamamatsu, Japan

[73] Assignee: Yamaha Corporation, Hamamatsu, Japan

[21] Appl. No.: 928,632

[22] Filed: Sep. 12, 1997

Related U.S. Application Data

[63] Continuation of Ser. No. 502,284, Jul. 13, 1995, abandoned.

[30] Foreign Application Priority Data

Jul. 15, 1994 [JP] Japan .................................... 6-186749
Jul. 15, 1994 [JP] Japan .................................... 186750

[51] Int. Cl.[6] .................................... G11B 3/90; G10H 7/00

[52] U.S. Cl. .................................... 369/60; 369/54; 369/58; 84/602

[58] Field of Search .................................... 84/601, 602, 609, 84/612

[56] References Cited

U.S. PATENT DOCUMENTS 4,792,975 12/1988 MacKay .................................... 381/94
5,313,011 5/1994 Koguchi .................................... 84/609
5,337,295 8/1994 Maeda .................................... 369/32
5,426,540 6/1995 Mikami .................................... 360/51
5,469,508 11/1995 Vallier .................................... 381/63
5,471,450 11/1995 Yonemitsu et al. .................................... 369/60
5,502,700 3/1996 Shinada .................................... 369/50

*Primary Examiner*—Aristotelis M. Psitos
*Assistant Examiner*—Regina Y. Neal
*Attorney, Agent, or Firm*—Pillsbury Madison & Sutro LLP

[57] ABSTRACT

In a disk recording and sound reproducing device, a disk is intermittently accessed for data read out to write the disk readout data into a memory. The written data in the memory are continually read out and expanded to output the expanded data as playback data signals. Data to be recorded are continually written into the memory, during which time the data to be recorded are intermittently read out from the memory 10 to be demodulated so as to record the demodulated data onto the disk. A clock controller, in accordance with a pitch change instruction, varies the rate of data readout from the memory (in reproduction) or the rate of data writing into the memory (in recording). Corresponding to the data readout or writing rate, a memory controller controls the intervals at which the data are read out from the disk (in reproduction) or the intervals at which the data are recorded onto the disk (in recording). Further, in accordance with a timing shift instruction, a system controller varies the intervals between the intermittent data writing into the memory so as to selectively change the reproduction timing of a specific portion of the data.

12 Claims, 6 Drawing Sheets

DISK RECORDING AND SOUND REPRODUCING DEVICE USING PITCH CHANGE AND TIMING ADJUSTMENT

This is a continuation of application Ser. No. 08/502,284, filed Jul. 13, 1995, now abandoned.

BACKGROUND OF THE INVENTION

The present invention relates to a disk recording and sound reproducing device for use with disks such as compact disks (CDs) or mini disks (MDs). More particularly, this invention relates to controlling pitch, key, tempo, etc., during reproduction and recording (which together will be referred to as pitch change). The present invention also relates to reproduction timing adjustment in a disk sound reproducing device for use with a CD or an MD.

In conventional disk recording and sound reproducing devices, such as CD players, where data are successively read out from a disk for successive reproduction or playback, if pitch control is to be effected, the frequency of a main clock for a decoder and also the number of rotations of the disk to change the rate of data readout transfer from the disk (linear speed of the disk) are usually varied, so as to allow the disk-recorded data to be reproduced at a desired pitch.

However, with the above-mentioned prior devices, it is not possible to reproduce the disk-recorded data with specific portions of the data selectively speeded up or slowed down in tempo. For example, when a relatively difficult musical phrase is performed rather slowly for real-time recording onto a disk, and then the thus-recorded phrase is to be reproduced in the normal tempo, the prior art devices are unable to appropriately vary the disk's linear speed instantaneously (i.e., within a very short time). Even when the disk's linear speed can be varied within a short time, the linear speed variation would undesirably result in unstable operation of the servo system.

Further, when editing a live performance recorded on disk using a conventional disk recording and sound reproducing device, the user may notice that some sounds are out of timing. For example, when a drum performance is recorded, the user may notice that cymbal sounds are out of timing somewhere in the performance being reproduced. Even a single timing deviation in a large-sound instrumental part, like a cymbal part, would greatly affect the entire music piece reproduction.

Such a timing deviation could be undetectable if, during editing, one could instantaneously adjust the reproduction timing of a specific portion of the recorded performance.

However, with the above-mentioned prior disk recording and sound reproducing devices, such as CD players, which successively read out data for successive reproduction, it is not possible to instantaneously vary the reproduction timing of a specific portion of the recorded performance. Rather, it has been conventional to re-record the portion out of reproduction timing or the entire musical piece. But, in the case of live performance recording, such re-recording is often not possible.

SUMMARY OF THE INVENTION

Therefore, it is an object of the present invention to provide disk recording and sound reproducing devices which are capable of instantaneously varying the pitch of a specific portion of recorded data on a disk with no effect on rotation control of the disk.

It is another object of the present invention to provide a device which is capable of instantaneously varying the reproduction timing of a specific portion of recorded data on a disk with no effect on rotation control of the disk.

In order to achieve the above-mention objects, the present invention provides a disk reproducing device which comprises a disk recording and sound access section for accessing a disk to read out data therefrom, a demodulation section for demodulating the data read out from the disk by the disk access section, a storage section for temporarily storing the data demodulated by the demodulation section, an output section for outputting the demodulated data from the storage section as playback data signals, and a control section for intermittently writing the demodulated data into the storage section at a first rate, during which time the control section continually reads out the demodulated data from the storage section at a second rate lower than the first rate, and, on the basis of a pitch change instruction, varies the second rate at which the demodulated data are read out from the storage section and a writing period in which the demodulated data are intermittently written into the storage section at the first rate.

In the disk recording sound reproducing device thus arranged, the data which are read out from the disk by the disk access section and demodulated by the demodulation section are temporarily stored in the storage section and then read out from the storage section to be provided as playback data signals. Since the rate of data writing into the storage section is higher than the rate of data readout from the storage section, the data writing into the storage section is an intermittent operation and the data readout from the storage section is a successive operation.

By the control section varying the rate of the successive data readout from the storage section to thereby effect a pitch change during reproduction, the present invention allows the pitch of a specific portion of the disk to be selectively changed instantaneously irrespective of the rotation control of the disk. Further, in correspondence with the varied rate of the data readout from the storage section, varying the writing period in which the data are written into the storage section (i.e., the waiting time between individual writing operations), allows the data to be continually read out from the storage section without causing any break in the playback data.

The present invention also provides a disk recording and sound reproduction device which comprises a storage section for temporarily storing data to be recorded, a modulation section for modulating the data read out from the storage section, a writing section for writing the data modulated by the modulation section onto a disk, and a control section for continually writing the data to be recorded into the storage section at a predetermined rate, during which time the control section intermittently reads out the written data from the storage section at another rate higher than the predetermined rate, and, on the- basis of a pitch change instruction, varies the predetermined rate at which the data to be recorded are written into the storage section and a readout period in which the written data are intermittently read out from the storage section into the modulation section at the other rate.

Thus recorded, with embodiments of the present invention, data to be recorded are temporarily stored in the storage section and then read out therefrom to the modulation section. Since the rate of data writing into the storage section is lower than the rate of data readout from the storage section, the data writing into the storage section is a successive operation and the data readout from the storage section is an intermittent operation.

With the control section varying the rate of the successive data writing into the storage section to thereby effect a pitch change during reproduction, the present invention allows the pitch of a specific portion of the disk to be selectively changed instantaneously irrespective of the rotation control of the disk. Further, in correspondence with the varied rate of the data writing into the storage section, varying the readout period in which the data are read out from the storage section, i.e., the waiting time between individual reading operations, allows continual writing of the data into the storage section without causing any break in the data to be recorded.

Embodiments of the present invention further provides a disk reproducing device which comprises a disk access section for accessing a disk to read out data therefrom, a demodulation section for demodulating the data read out from the disk by the disk access section, a storage section for temporarily storing the data demodulated by the demodulation section, an output section for outputting the demodulated data from the storage section as playback data signal, and a control section for intermittently writing the demodulated data into the storage section at a first rate, during which time the control section continually reads out the demodulated data from the storage section at a second rate lower than the first rate, and, on the basis of a timing shift instruction, varies writing intervals at which the demodulated data are intermittently written into the storage section at the first rate to thereby change reproduction timing of the data.

In the disk recording and sound reproducing device thus arranged, the data read out from the disk by the disk access section and demodulated by the demodulation section are temporarily stored in the storage section and then read out from the storage section to be provided as playback data signals. Since the rate of data writing into the storage section is higher than the rate of data read out from the storage section, the data writing into the storage section is an intermittent operation and the data read out from the storage section is a successive operation.

With the control section varying the intervals of the intermittent data writing into the storage section to thereby change reproduction timing, embodiments of the present invention allow the reproduction timing of a specific portion of the disk to be selectively changed instantaneously irrespective of the rotation control of the disk, i.e., with the structure of the disk rotation control system left unchanged from that in the conventional devices.

For a better understanding of other objects and advantages of the present invention, the preferred embodiments of the invention will be described in detail below with reference to the accompanying drawings.

BRIEF DESCRIPTION OF THE INVENTION

DETAILED DESCRIPTION OF THE PREFERRED EMBODIMENT

Figure 1:
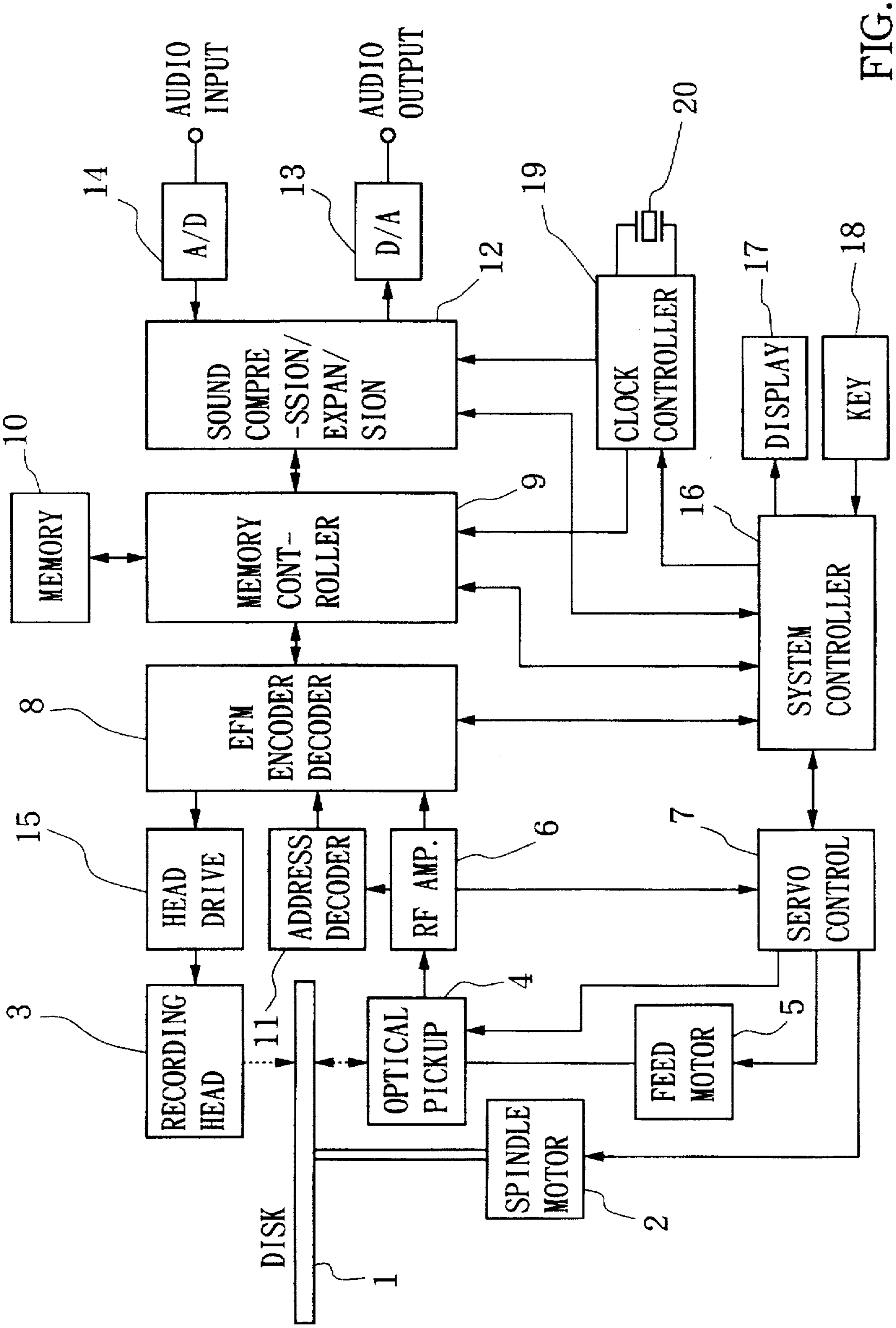
FIG. 1 is a block diagram illustrating the general arrangement of an MD player in accordance with an embodiment of the present invention.

FIG. 1 is a block diagram illustrating the general arrangement of an MD (mini disk) player in accordance with an embodiment of the present invention.

An MD type disk 1 is a recordable/reproducible optical magnetic disk, which is driven for rotation by a spindle motor 2 typically at a constant linear speed. A magnetic recording head 3 and an optical pickup 4 are provided above and below the mini disk 1, respectively. The magnetic recording head 3 applies a magnetic field to the disk 1 to write information thereon, and the optical pickup 4 has functions of optically reading information from the disk 1 and of writing information onto the disk 1 in cooperation with the magnetic recording head 3. The optical pickup 4 is movable, by means of a feed motor 5, along the radius of the disk 1. The read output from the optical pickup 4 is amplified by a high-frequency radio frequency (RF) amplifier 6 and then supplied to a servo control section 7. On the basis of the output from the optical pickup 4, the servo control section 7 controls the rotating and feeding drive operations of the spindle motor 2 and feed motor 5 and performs focus/tracking control of the pickup 4.

The reproduction system of the MD player 1 is constructed as follows. The output signal from the RF amplifier 6 is also supplied to an eight-to-fourteen modulation (EFM) encoder/decoder 8, which in turn decodes the output signal from the RF amplifier 6 in accordance with an error correcting technique based on the Advanced Cross Interleave Reed-Solomon Code (ACIRC) and demodulates the 14-bit data back to 8-bit data. The thus decoded and demodulated data is then stored into a buffer memory 10 under the control of a memory controller 9. A readout address to be used for that purpose is given by an address decoder 11 decoding the output from the RF amplifier 6. The data stored in the memory 10 is read out by the memory controller 9, converted into expanded form by a sound compression/expansion section 12, converted into analog representation by a D/A converter 13 and then output as a reproduced or playback audio output data signal.

On the other hand, the recording system of the MD player 1 is constructed as follows. An audio input data signal to be recorded is supplied to the sound compression/expansion section 12 after having been converted into digital representation by an A/D converter 14. The supplied data is compressed by the compression/expansion section 12 and then stored in the memory 10 under the control of the memory controller 9. The data to be recorded and stored in the memory 10 is then fed onto the EFM encoder/decoder 8 under the control of the memory controller 9, and supplied to a head drive 15 after having been subjected to EFM modulation and ACIRC-based coding. The recording head 3 is driven by the head drive 15 to record necessary data onto the disk 1.

In addition to the above-mentioned components, the MD player includes a system controller 16 for controlling the entire system, and a display 17 for visually presenting various information. The MD player further includes a plurality of operating keys 18 which allow the user to designate any of reproduction, recording and editing modes, to instruct a pitch change and to designate necessary address therefor. In addition, the MD player includes a clock controller 19 which, in accordance with a pitch change instruction, varies operating clock pulses to be applied to the memory controller 9 and sound compression/expansion section 12, as well as an oscillator 20 which supplies reference clock pulses CK for use in the clock controller 19.

The system controller 16 has a control function to perform in accordance with a timing shift instruction, instantaneously varying the intervals at which the data are written by the memory controller 9 into the buffer memory 10.

The characteristic operation of the MD player, thus constructed, will be described hereinafter.

The sound compression is performed in the sound compression/expansion section 12 in such a manner as to remove unnecessary data by use of human auditory properties. For example, a compression technique known as Adaptive Transform Acoustic Coding (ATRAC) achieves compression up to about one-fifth of the original data amount. Since the data recorded onto the disk 1 are in compressed form, as noted above, access to the disk 1 becomes intermittent in relation to the successively supplied data signals to be recorded and the successively output playback data signals. For this reason, the MD player is provided with the buffer memory 10 to provide timing adjustment between the two data signals, and the buffer memory 10 provides the so-called "shockproof" function.

Figure 2A:
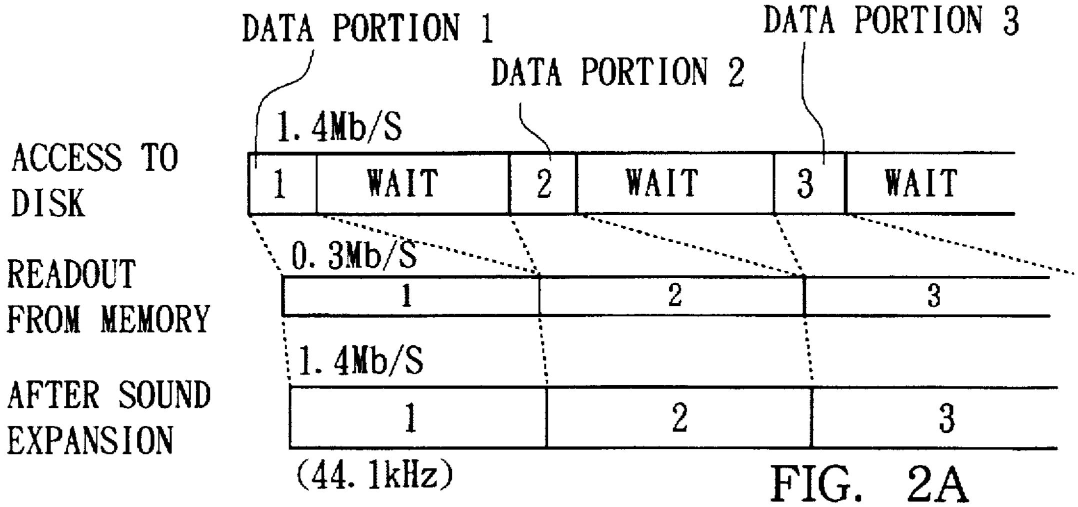
FIG. 2A is a timing chart illustrating operation of the MD player in the normal reproduction mode where no pitch change is made.

FIG. 2A is a timing chart explanatory of the operation of the MD player in the normal reproduction mode where no pitch change is made.

In this normal reproduction mode, the MD player intermittently reads out the data recorded on disk 1 in compressed form and demodulates the read out data to intermittently write the demodulated data into the buffer memory 10 at a rate of, say, 1.4 Mb/s (first rate), during which time the player continually or successively reads out the thus-written data from the memory 10 at a rate of, say, 0.3 Mb/s (second rate), expands the read out data, and then outputs the expanded data as playback data signals at a transfer rate of 1.4 Mb/s.

Figure 2B:
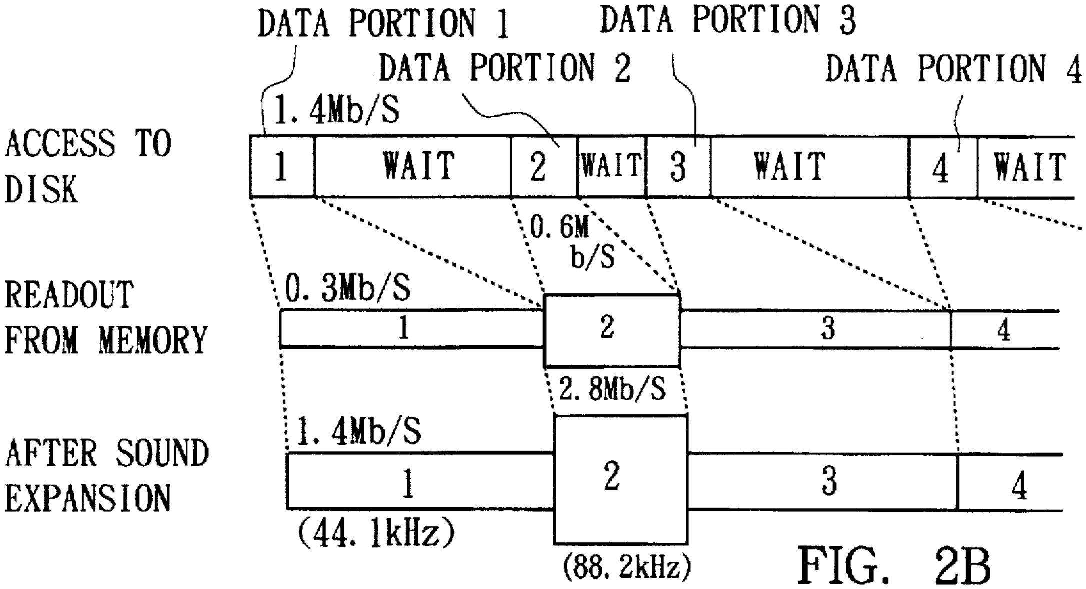
FIG. 2B is a timing chart illustrating reproduction operation of the MD player where the data are reproduced with a specific portion of the data selectively raised in pitch.

FIG. 2B is a timing chart explanatory of the reproduction operation of the MD player where the data are reproduced with a specific portion of the data selectively raised in pitch. As in the normal reproduction, read data portion "1" is read out from the disk 1 at a transfer rate of 1.4 Mb/s to be written into the buffer memory 10 after demodulation, and the thus-written data are successively read out from the memory 10 at a transfer rate of 0.3 Mb/s. Then, the data, after sound expansion, are output as playback data signals at a transfer rate of 1.4 Mb/s. However, for readout of the following read data portion "2", the clock controller 19 supplies the memory controller 9 and sound compression/expansion section 12 with clock pulses having a frequency two times higher than in the normal reproduction. Thus, the data are read out from the buffer memory 10 at a transfer rate of 0.6 Mb/s, which is two times higher than the normal rate, so that the data are output from the sound compression/expansion section 12 at a transfer rate of 2.8 Mb/s, which is also two times higher than the normal rate. The sampling frequency of read data portion "2" is 88.2 kHz, which is two times higher than the normal, and hence this portion "2" will be reproduced in a pitch one octave higher than the other portions.

The memory controller 9 always watches the changing data storage or accumulation amount (current data balance) in the buffer memory 10; and when the data accumulation has progressed to reach near the last address in the memory 10, the controller 9 instructs readout of a next read data portion. Before the data storage progresses to near the last address, the memory controller 9 causes the data read out to wait. Therefore, as the data are read out from the buffer memory 10 two times faster than the normal rate, the data accumulation amount in the memory 10 decreases rapidly, so that the waiting time between read portions "2" and "3" becomes shorter than in the normal rate reproduction. That is, there is varied the data writing period in which the demodulated readout data from the disk 1 are intermittently written into the buffer memory 10 at a transfer rate of 1.4 Mb/s. More specifically, the data writing period is varied to be shorter in such a manner that the writing time is greater than the waiting time in terms of the duty ratio between the writing time and the waiting time. In the example of FIG. 2(*b*), the normal pitch reproduction is resumed at read data portion "3", and hence the same operation as in the normal reproduction mode takes place in and after read data portion "3".

Figure 2C:
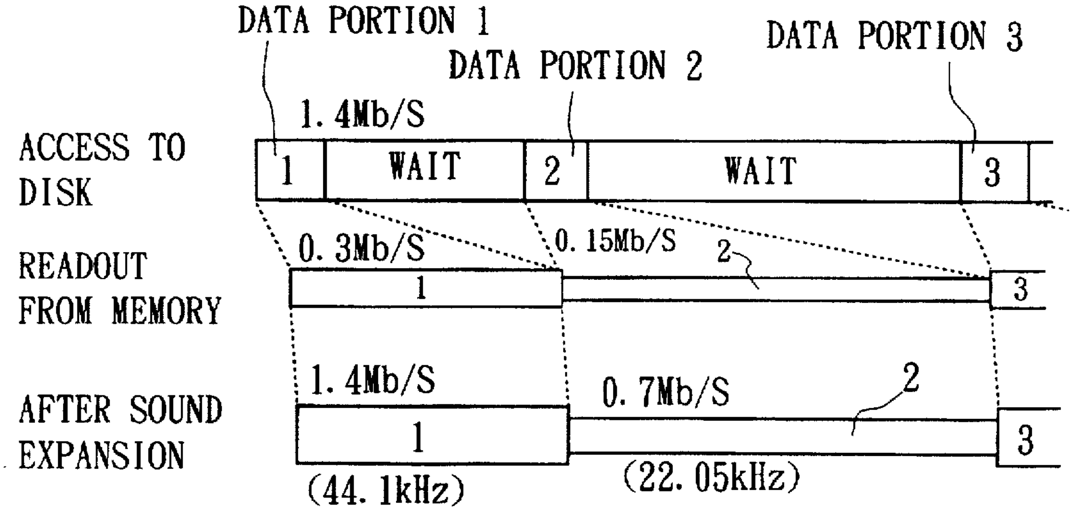
FIG. 2C is a timing chart illustrating reproduction operation of the MD player where the data are reproduced with a specific portion of the data selectively lowered in pitch.

FIG. 2C is a timing chart explanatory of the reproduction operation of the MD player where the data are reproduced with a specific or selected portion of the data lowered in pitch. The operation for read data portion "1" is the same as in the normal reproduction. However, for readout of the following read data portion "2", the clock controller 19 supplies the memory controller 9 and sound compression/expansion section 12 with clock pulses having a ½ frequency of that in the normal reproduction. Thus, the data are read out from the buffer memory 10 at a transfer rate of 0.15 Mb/s, which is ½ of the normal rate, so that the data are output from the sound compression/expansion section 12 at a transfer rate of 0.7 Mb/s, which is also ½ of the normal rate. The sampling frequency of read data portion "2" is 22.05 kHz which is also ½ of the normal one, and hence this read data portion "2" will be reproduced in a pitch one octave lower than the other portions.

In this example, because the data are read out from the buffer memory 10 at ½ the normal rate, the data accumulation amount in the memory 10 decreases more slowly than in the normal reproduction, so that the waiting time between read data portions "2" and "3" becomes longer than that in the normal rate reproduction. That is, there is varied the data writing period in which the demodulated readout data from the disk 1 are intermittently written into the buffer memory 10 at a transfer rate of 1.4 Mb/s. More specifically, the data writing period in this example is varied to be greater in such a manner that the writing time is shorter than the waiting time in terms of the duty ratio between the writing time and the waiting time. In the example of FIG. 2(c), the normal pitch reproduction is resumed at read data portion "3", and hence the same operation as in the normal reproduction takes place in and after read data portion "3".

Figure 3:
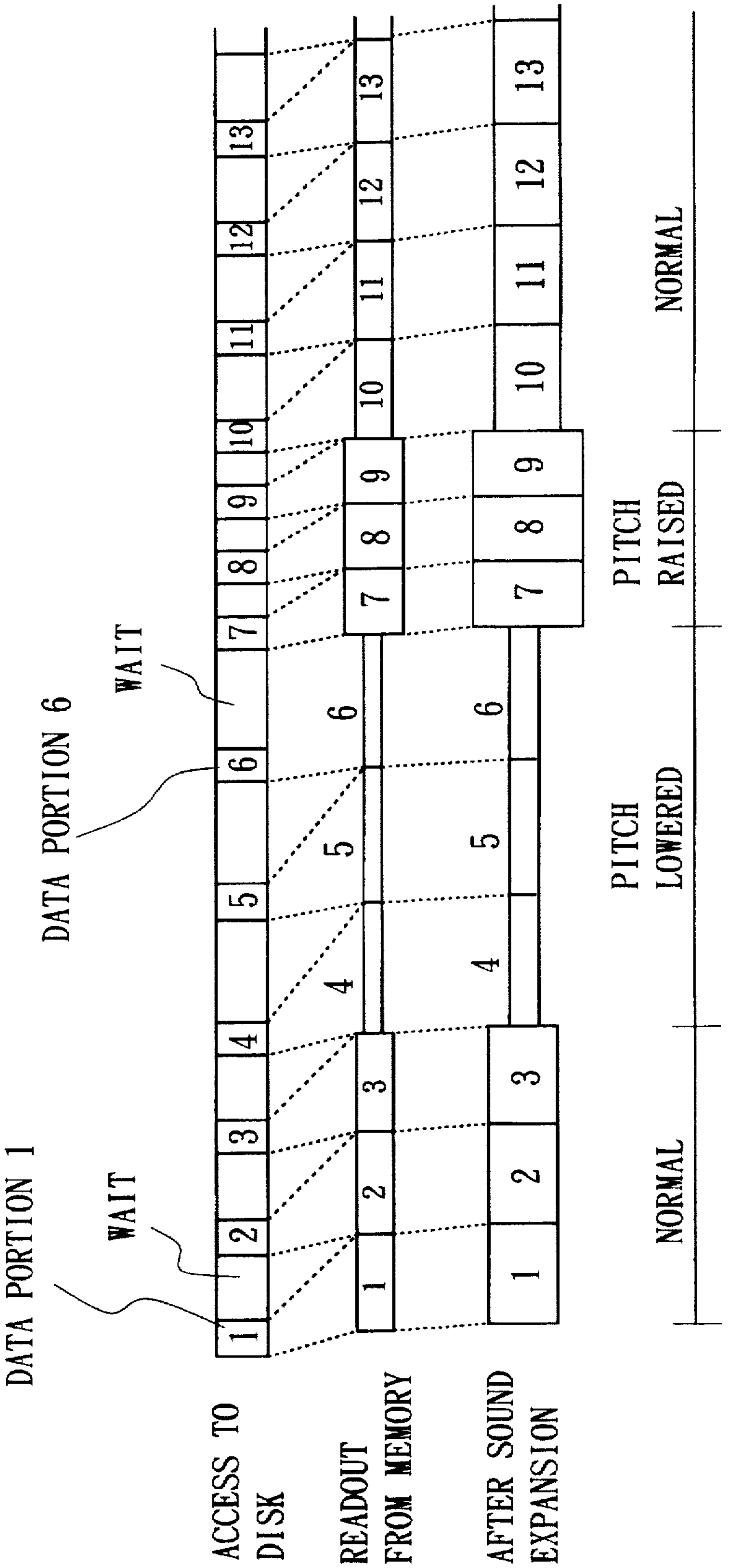
FIG. 3 is a timing chart illustrating reproduction operation of the MD player of FIG. 1 where pitch change is effected in real time.

FIG. 3 is a timing chart showing in which pitch changes are made in real time by raising and lowering the pitch of specific portions of the data.

The embodiment as described above, allows performance of partial and instantaneous pitch change without causing any change in the linear speed of the disk 1 itself, by varying the rate of the data read out from disk 1 and the intervals of the data writing into the buffer memory 10.

As partial pitch change is described above in the reproduction mode, such partial pitch change can also be made in the recording mode using the same principle.

Namely, in the recording mode, the sound compression/expansion section 12 compresses data signals to be recorded and successively writes the compressed data into the buffer memory 10 at a rate of, say, 0.3 Mb/s (second rate), during which time the thus-written compressed data are intermittently read out from the memory 10 at a rate of, say, 1.4 Mb/s (first rate) and are modulated by the EFM encoder/decoder 8 to be intermittently recorded onto the disk 1.

To effect pitch change in the recording mode, there are varied, as in the reproduction mode, the second rate at which the compressed data obtained via the sound compression/expansion section 12 are written into the buffer memory 10, and the readout period. For example, the internals of the individual readout operations which are performed intermittently at the first rate to read out the compressed data from the memory 10 and to send the read-out data to the EFM encoder/decoder 8. Thus, when a difficult-to-play musical phrase is to be recorded onto the disk 1, the user or player may perform and record the difficult phrase in a slower tempo with a lowered key, by using of the pitch change function for recording. Then, in the normal reproduction, the difficult phrase thus recorded can be reproduced in the normal tempo with the key automatically raised. Such arrangements achieve a very convenient disk recording and sound reproducing device.

If the address where a pitch change is to be effected is known in advance, the desired pitch change can be achieved by inputting such an address via the operating keys 18. In such a case where the pitch change is to be made while listening to reproduced sounds, the desired pitch change can be instructed by activating any of the operating keys 18 at the time of the change. Further, so the user may readily know the address to effect a pitch change, it is desirable that the display 17 displays a disk address, reproduction time data or a memory address at any timing desired by the user.

Figure 4:
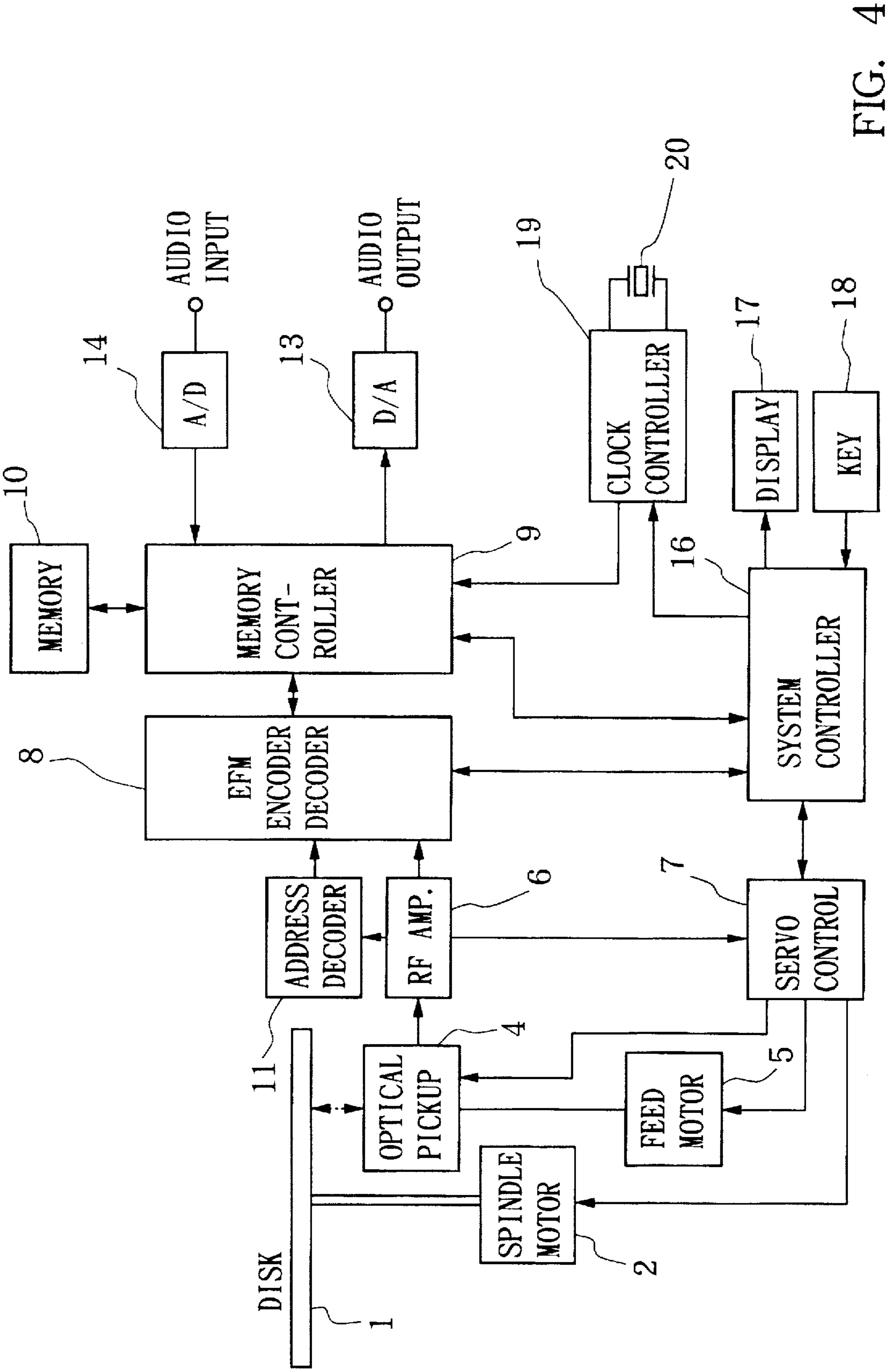
FIG. 4 is a block diagram illustrating the general arrangement of a CD player in accordance with another embodiment of the present invention.

FIG. 4 shows an example where embodiments of the present invention are applied to a CD player in which the data recorded on a CD disk are intermittently reproduced with the disk's linear speed made higher than in the normal reproduction. Components denoted by the same reference numerals as in FIG. 1 will not be described to avoid unnecessary duplication.

This CD player is different from the MD player of FIG. 1 in that it uses a read-only disk 1 and hence includes no data writing elements, and it lacks the sound compression/expansion section 12. In this CD player as well, the pitch can be changed by varying the rate of data read out from the buffer memory 10 and the intervals of data writing into the memory 10.

In the case of the MD player, both the reproduction mode and the recording mode may operate simultaneously, so that it is possible to record data onto the disk while reproducing thus-recorded data therefrom, or to synthesize the reproduced data and other desired data to thereby re-record the resultant synthesized data onto the disk. A multi-track MD player having such an editing mode can provide even greater convenience if it is equipped with the pitch, key and tempo changing functions of embodiments of the present invention for both the reproduction and recording operations.

Figure 5A:
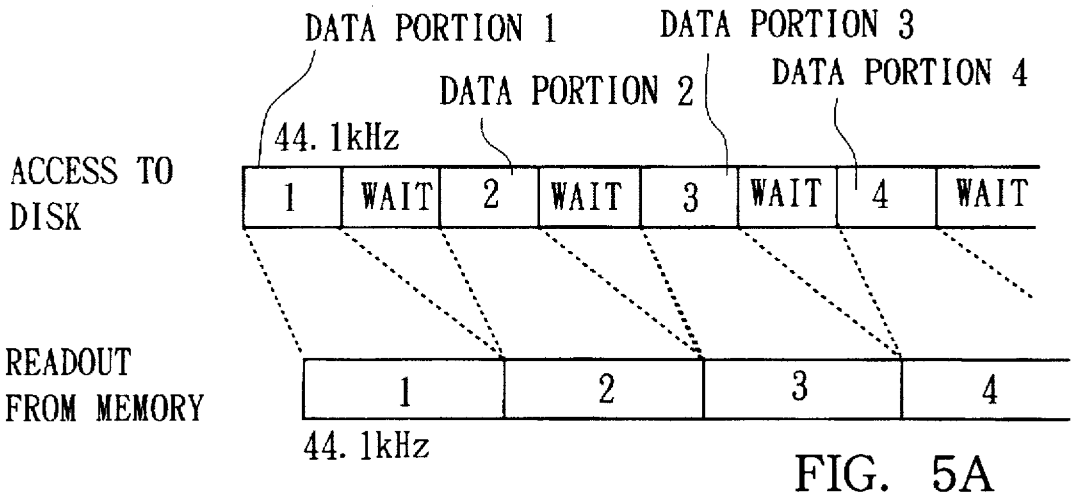
FIGS. 5A to 5C are timing charts illustrating reproduction operation of the CD player of FIG. 4 involving pitch change.
Figure 5B:
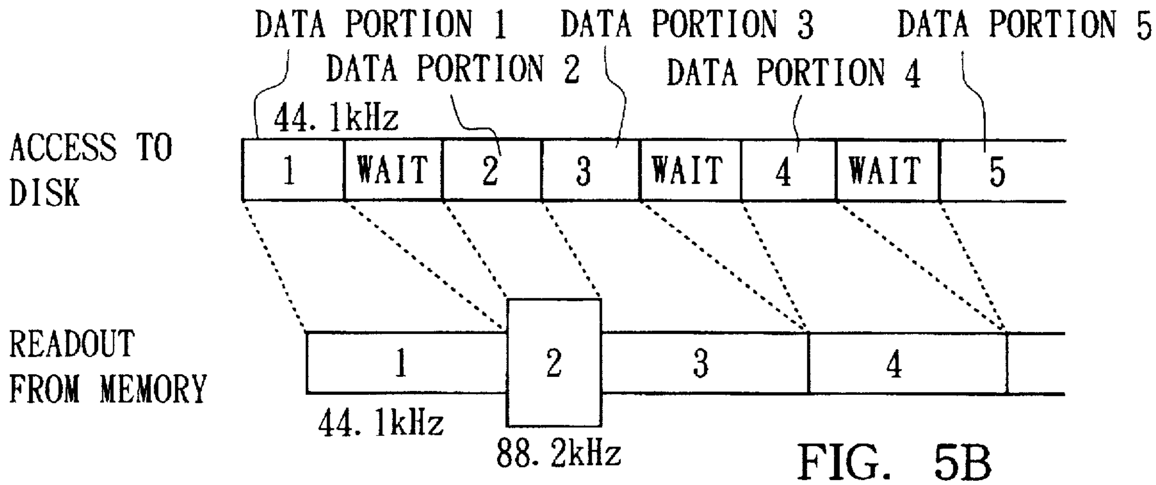
Figure 5C:
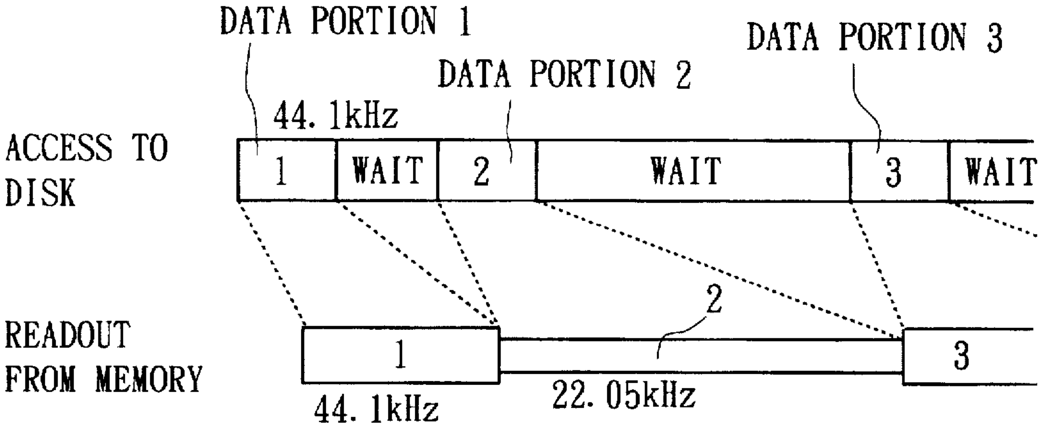

FIGS. 5A–5C are timing charts that illustrate the reproduction operations of the CD sound reproducing device embodiment, shown in FIG. 4, which uses pitch change.

Further, the MD player of FIG. 1 provides a reproduction timing shift or change function as follows.

Figure 6A:
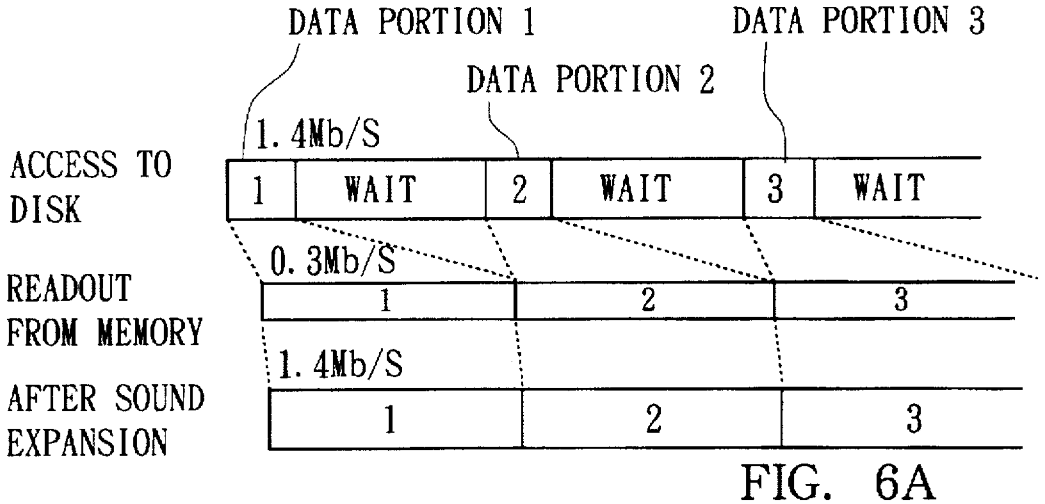
FIG. 6A is a timing chart illustrating operation of the MD player in the normal reproduction mode where no timing shift is made.

FIG. 6A is a timing chart explanatory of the operation of the MD player in the normal reproduction mode where no timing shift is made.

In this normal reproduction mode, as previously mentioned in relation to FIG. 2A, the MD player intermittently reads out the data recorded on the disk 1 in compressed form and demodulates the read-out data (disk readout data) to intermittently write the demodulated data into the buffer memory 10 at a rate of, say, 1.4 Mb/s (first rate), during which time the player continually or successively reads out the thus-written data from the memory 10 at a rate of, say, 0.3 Mb/s (second rate), expands the data and then outputs the expanded data as playback data signals at a transfer rate of 1.4 Mb/s.

Figure 6B:
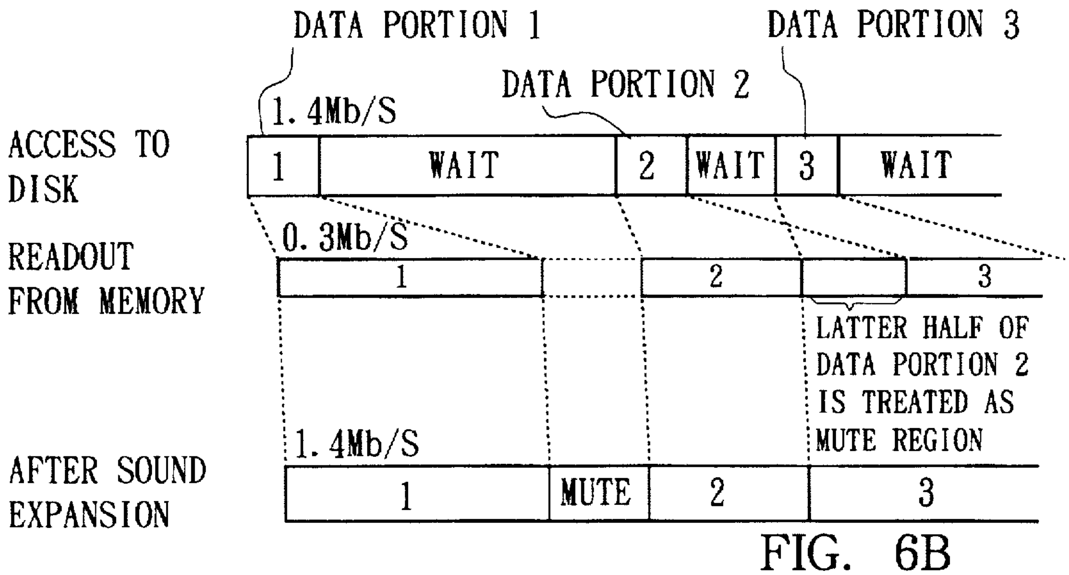
FIG. 6B is a timing chart illustrating reproduction operation of the MD player where the data are reproduced with a specific portion of the data selectively retarded in reproduction timing.

FIG. 6B is a timing chart explanatory of the operation of the MD player where the data are reproduced with a specific portion of the data selectively retarded in reproduction timing. As in the normal reproduction mode, read data portion "1" are read out from the disk 1 at a transfer rate of 1.4 Mb/s to be written into the buffer memory 10 after the demodulation, and the thus-written data are successively read out from the memory 10 at a transfer rate of 0.3 Mb/s. Then, after having been subjected to the sound expansion, the data are output as playback data signals at a rate of 1.4 Mb/s.

However, in the case of FIG. 6B, the timing to read out the following read data portion "2" is retarded relative to the corresponding reproduction timing in the normal reproduction. Because of this retardation, the buffer memory 10 will run out of data "1" be fore the next data portion "2" is completely stored in the memory 10. Thus, the system controller 16 detects when the last write address value is reached for data portion "1" in the buffer memory 10, and suspends the data supply to the sound compression/expansion section 12 until the next read data portion "2" is completely stored in the memory 10 and becomes ready for readout. Then, in expanding the supplied data, the sound compression/expansion section 12 treats the data devoid region as a mute or silent region so as not to reproduce any sound. In this way, read data portion "2" is reproduced after the silent region so that the reproduction timing of this data portion is selectively retarded.

For the following read data portion "3", the waiting time is made shorter than normal to restore its reproduction timing to the normal timing. Because of this, before data portion "2" is completely read out, the next data portion "3" is written into the buffer memory 10 and becomes ready for readout, so that the latter half region of data portion "2" will not be used. The data region not used presents no significant problem if it is originally recorded as a silent region; alternatively, it may be set as a silent region in advance by an editing process. In this way, read data portion "3" is reproduced at the normal reproduction timing. Namely, only the reproduction timing of read data portion "2" is selectively retarded relative to the other data portions.

Figure 6C:
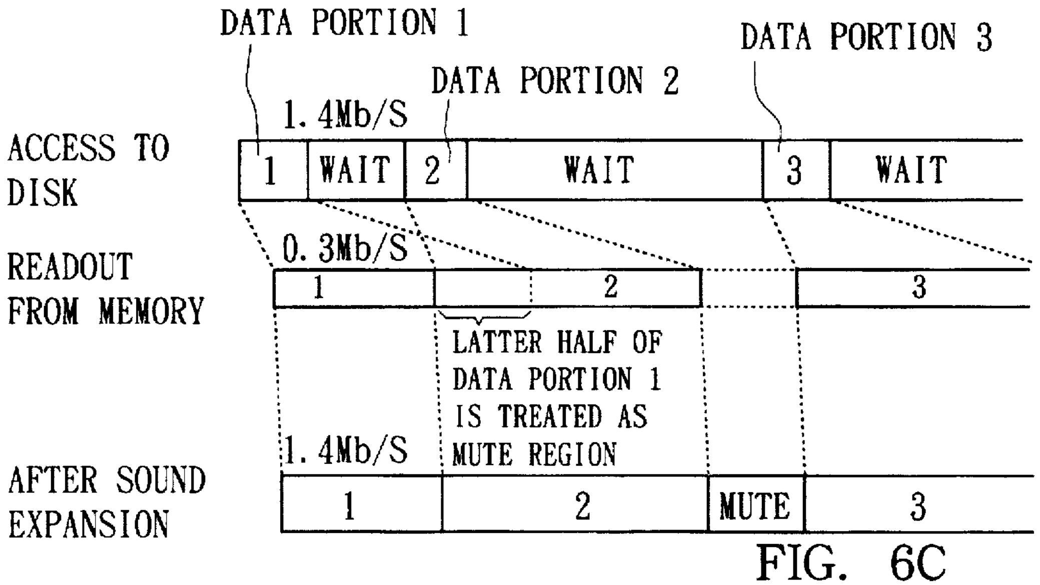
FIG. 6C is a timing chart illustrating reproduction operation of the MD player where the data are reproduced with a specific portion of the data selectively accelerated in reproduction timing.

FIG. 6C is a timing chart explanatory of the operation of the MD player where the data are reproduced with a specific portion of the data accelerated in reproduction timing. The operation for read portion "1" is the same as in the normal reproduction. However, the timing to read out the following read data portion "2" from the disk 1 is made earlier than in the normal reproduction. Because of this, before data portion "1" is completely read out, the next data portion "2" is written into the buffer memory 10 and becomes ready for readout, so that the latter half region of data portion "1" will not be used. The data region not used presents no significant problem if it is originally recorded as a silent region; alternatively, it may be set as a silent region in advance by an editing process.

However, for the following read data portion "3", the waiting time is made longer than normal to restore its reproduction timing to the normal timing. Because of this, the buffer memory 10 will run out of data "2" before the next data portion "3" is completely stored in the memory 10. Thus, the system controller 16 detects when the last write address value is reached for data portion "2" in the buffer memory 10, and suspends the data supply to the sound compression/expansion section 12 until the next read data portion "3" is completely stored in the memory 10 and becomes ready for readout. Then, in expanding the supplied data, the sound compression/expansion section 12 treats the data devoid region as a mute or silent region so as not to reproduce any sound. In this way, read data portion "3" is reproduced after the silent region so that only the reproduction timing of this data portion is selectively accelerated relative to the other data portions.

If the address where a timing shift is to be effected is known in advance, the desired timing shift can be effected by inputting such an address via the operating keys 18. Where a timing shift is to be effected while listening to reproduced sounds, the desired timing shift can be instructed by activating any of the operating keys 18 at the timing for the shift. Further, to allow the user to easily know the address to effect the timing shift, it is desirable that the display 17 displays a disk address, reproduction time data or a memory address at any desired timing.

While the operation of FIG. 6 has been described above in connection with the MD player, it may also apply to a CD player by making the disk linear speed higher than normal and providing a similar buffer memory such that data are intermittently read out from the disk to be written into the memory at a high rate and the written data are successively read out from the disk at a low rate.

Further, what are recorded and reproduced with the device may be other than audio signals, such as video signals or other data.

As described, the present invention is characterized in that the rate of data readout from the buffer memory is varied to effect a pitch change during reproduction and the rate of data writing into the buffer memory is varied to effect a pitch change during recording. With this feature, the pitch of a specific portion of the disk can be selectively changed instantaneously without influencing the rotation control of the disk.

The present invention is also characterized in that the intervals at which data are written into the buffer memory is varied to effect reproduction timing adjustment. With this feature, the reproduction timing of a specific portion of the disk can be selectively changed instantaneously without influencing the rotation control of the disk.

What is claimed is:

1. A disk reproducing device comprising:

disk access means for accessing a disk to read out data therefrom at a reproducing speed;

demodulation means for demodulating the data read out from the disk by said disk access means;

storage means for temporarily storing the data demodulated by said demodulation means;

output means for outputting the demodulated data from said storage means as a playback data signal; and control means for intermittently writing the demodulated data into said storage means at a fixed first rate, during which time said control means continually reads out the demodulated data from said storage means at a second rate that is lower than the fixed first rate, and, on the basis of a pitch change instruction, varies said second rate at which the demodulated data are read out from said storage means and a writing period in which the demodulated data are intermittently written into said storage means at said fixed first rate.

wherein said control means varies said second rate and said writing period on the basis of the pitch change instruction without adjusting the reproducing speed.

2. A disk recording device comprising:

storage means for temporarily storing data to be recorded;

modulation means for modulating the data read out from said storage means;

writing means for writing the data modulated by said modulation means onto a disk at a recording speed; and control means for continually writing the data to be recorded into said storage means at a first predetermined rate, during which time said control means intermittently reads out the written data from said storage means at second fixed rate that is higher than said first predetermined rate, and, on the basis of a pitch change instruction, varies said first predetermined rate at which the data to be recorded are written into said storage means and a readout period in which the written data are intermittently read out from said storage means into said modulation means at said second fixed rate, wherein said control means varies said first predetermined rate and said readout period on the basis of the pitch change instruction without adjusting the recording speed.

3. A disk reproducing device comprising:

disk access means for accessing a disk to read out data therefrom;

demodulation means for demodulating the data read out from the disk by said disk access means;

storage means for temporarily storing the data demodulated by said demodulation means;

output means for outputting the demodulated data from said storage means as a playback data signal; and control means for intermittently writing the demodulated data into said storage means at a fixed first rate, during which time said control means continually reads out the demodulated data from said storage means at a second rate that is lower than the fixed first rate, and, on the basis of a timing shift instruction, varies writing intervals at which the demodulated data are intermittently written into said storage means at said fixed first rate to thereby change reproduction timing of the data such that said variation of the writing intervals creates mute regions in the playback data signal.

4. A disk reproducing device in accordance with claim 3, wherein the second rate is varied such that the timing shift is performed without a change in key.

5. A disk reproducing device comprising:

a disk access mechanism that accesses a disk to read out data stored on the disk at a reproducing speed;

a demodulation circuit that demodulates the data read out from the disk by the disk access mechanism;

a storage device that temporarily stores the data demodulated by the demodulation circuit;

an output circuit that outputs the demodulated data from the storage device as a playback data signal; and a control circuit that intermittently writes the demodulated data into the storage device at a fixed first rate, during which time the control circuit also continually reads out the demodulated data from the storage device at a second rate that is lower than the fixed first rate, and, on the basis of a pitch change instruction, varies the second rate at which the demodulated data are read out from the storage device and a writing period in which the demodulated data are intermittently written into the storage device at the fixed first rate.

wherein said control circuit varies said second rate and said writing period on the basis of the pitch change instruction without adjusting the reproducing speed.

6. A disk recording device comprising:

a storage device that temporarily stores data to be recorded:

a modulation circuit that modulates the data read out from the storage device;

a writing mechanism that writes the data modulated by the modulation circuit onto a disk at a recording speed; and a control circuit that continually writes the data to be recorded into the storage device at a first predetermined rate, during which time the control circuit intermittently reads out the written data from the storage means at second fixed rate that is higher than the first predetermined rate, and, on the basis of a pitch change instruction, varies the first predetermined rate at which the data to be recorded are written into the storage device and a readout period in which the written data are intermittently read out from the storage means into the modulation circuit at the second fixed rate.

wherein said control circuit varies said first predetermined rate and said readout period on the basis of the pitch change instruction without adjusting the recording speed.

7. A disk reproducing device comprising:

a disk access mechanism that accesses a disk to read out data stored on the disk;

a demodulation circuit that demodulates the data read out from the disk by the disk access mechanism;

a storage device that temporarily stores the data demodulated by the demodulation circuit;

an output circuit that outputs the demodulated data from the storage device as a playback data signal; and a control circuit that intermittently writes the demodulated data into the storage device at a fixed first rate, during which time the control circuit continually reads out the demodulated data from the storage means at a second rate that is lower than the fixed first rate, and, on the basis of a timing shift instruction, varies writing intervals at which the demodulated data are intermittently written into the storage device at the fixed first rate to thereby change reproduction timing of the data such that said variation of the writing intervals creates mute regions in the playback data signal.

8. A disk reproducing device in accordance with claim 7, wherein the second rate is varied such that the timing shift is performed without a change in key.

9. A method of reproducing sound from data on a disk, the method comprising the steps of:

accessing the disk to read out data stored on the disk at a reproducing speed;

demodulating the accessed data read out from the disk;

temporarily storing the demodulated in a storage device;

outputting the demodulated data from the storage device as a playback data signal;

intermittently writing the demodulated data into the storage device at a fixed first rate;

continually reading out the demodulated data from the storage device at a second rate that is lower than the fixed first rate, while intermittently writing the demodulated data into the storage device; and varying the second rate at which the demodulated data are read out from the storage device and a writing period in which the demodulated data are intermittently written into the storage device at the fixed first rate on the basis of a pitch change instruction;

wherein said second rate and the said writing period are varied on the basis of the pitch change instruction without adjusting the reproducing speed.

10. A method of recording data for sound reproduction on a disk, the method comprising the steps of:

continually and temporarily storing data to be recorded into a storage device at a first predetermined rate;

reading out the data from the storage device;

modulating the data read out from the storage device;

writing the modulated data onto the disk at a recording speed:

intermittently reading out and writing the modulated data onto the disk at second fixed rate that is higher than the first predetermined rate, while continually storing the data to be recorded in the storage device; and varying the first predetermined rate at which the data to be recorded are written into the storage device and a readout period in which the written data are intermittently read out from the storage device and modulated at the second fixed rate on the basis of a pitch change instruction, wherein said first predetermined rate and said readout period are varied on the basis of the pitch change instruction without adjusting the recording speed.

11. A method of reproducing sound from data on a disk, the method comprising the steps of:

accessing the disk to read out the data stored on the disk at a reproducing speed;

demodulating the accessed data read out from the disk;

temporarily storing the demodulated data in a storage device;

outputting the demodulated data from the storage means as a playback data signal;

intermittently writing the demodulated data into the storage device at a fixed first rate;

continually reading out the demodulated data from the storage device at a second rate that is lower than the fixed first rate, while intermittently writing the demodulated data into the storage device; and varying the second rate at which the demodulated data are read out from the storage device and a writing period in which the demodulated data are intermittently written into the storage device at the fixed first rate on the basis of a timing shift instruction such that said variation of the writing period creates mute regions in the playback data signal.

12. A method in accordance with claim 11, wherein the second rate is varied such that the timing shift is performed without a change in key.

* * * * *